US 6,694,353 B2

(12) United States Patent
Sommerer (10) Patent No.: US 6,694,353 B2
(45) Date of Patent: Feb. 17, 2004

(54) METHOD AND SYSTEM FOR AUTOMATICALLY UPDATING ELECTRONIC MAIL ADDRESS INFORMATION WITHIN AN ELECTRONIC MAIL ADDRESS DATABASE

(75) Inventor: Peter Sommerer, Kanata (CA)

(73) Assignee: Good Contacts.com, Ottawa (CA)

( * ) Notice: Subject to any disclaimer, the term of this patent is extended or adjusted under 35 U.S.C. 154(b) by 272 days.

(21) Appl. No.: 09/818,517

(22) Filed: Mar. 28, 2001

(65) Prior Publication Data

US 2002/0143879 A1 Oct. 3, 2002

(51) Int. Cl.[7] .......................... B06F 15/16; B06F 17/30
(52) U.S. Cl. ..................... 709/206; 709/204; 707/10
(58) Field of Search .............................. 709/204–207; 707/8, 10

(56) References Cited

U.S. PATENT DOCUMENTS

| 6,047,327 | A | 4/2000 | Tso et al. | |
| 6,157,954 | A | 12/2000 | Moon et al. | |
| 6,195,686 | B1 * | 2/2001 | Moon et al. | 709/206 |
| 6,247,043 | B1 | 6/2001 | Bates et al. | |
| 6,269,369 | B1 | 7/2001 | Robertson | |
| 6,389,455 | B1 * | 5/2002 | Fuisz | 709/206 |
| 2002/0103932 | A1 * | 8/2002 | Bilbrey et al. | 709/245 |

FOREIGN PATENT DOCUMENTS

| JP | 11041275 | 2/1999 |
| JP | 11175427 | 7/1999 |
| JP | 2000066971 | 3/2000 |
| JP | 20011344176 | 12/2001 |
| WO | WO 01/06497 A2 | 1/2001 |

OTHER PUBLICATIONS

Nahabedian et al., "Diagnosing Delivery Problems in the White House Information–Distribution System", AI Magazine, Winter 1996, American Assoc. Artificial Intelligence, vol. 17, No. 4, pp. 21–30, XP002231328, USA.

* cited by examiner

*Primary Examiner*—David Wiley
*Assistant Examiner*—Joseph E. Avellino
(74) *Attorney, Agent, or Firm*—Freedman & Associates (57) ABSTRACT

A method is proposed for automatically updating and maintaining email contact information for various contacts stored in a contact database within or outside of an email application without requiring an individual to manually verify and update email addresses. The method flags an invalid email address of a destination individual when an error message is received indicative of mail delivery failure. Another available email address of the destination individual is then automatically designated as their primary address.

9 Claims, 7 Drawing Sheets

```
Contact Information
First Name:   John
Last Name:    Smith
Nickname:     Slugger
Email:        Jsmith@Company.Com
```

Figure 6

```
Contact Information
First Name:   John
Last Name:    Smith
Nickname:     Slugger
Email:        Jsmith@Company.Com        Status: Expired
```

Figure 7

```
Contact Information
First Name:   John
Last Name:    Smith
Nickname:     Slugger
Email:        John.Smith@Company.com    Status: Current
```

Figure 8

METHOD AND SYSTEM FOR AUTOMATICALLY UPDATING ELECTRONIC MAIL ADDRESS INFORMATION WITHIN AN ELECTRONIC MAIL ADDRESS DATABASE

FIELD OF THE INVENTION

This invention relates to a method of updating, maintaining and verifying electronic mail (email) address information for various contacts stored in a database.

BACKGROUND OF THE INVENTION

In the past, people have maintained contact lists on paper. The proverbial "black book" is a good example of a list of individuals and their contact information. Unfortunately, it is not uncommon that upon attempting to contact someone one discovers that the information is no longer accurate. This is of tremendous inconvenience, especially during emergency or time limited situations. Unfortunately, the task of maintaining a large contact list current is often too onerous for the few times one need to contact each individual.

Therefore, whenever someone changes address, phone numbers or any other piece of contact information, there is a necessity for them to provide their contacts with the most current contact data. Conventional methods of accomplishing this task include sending updated information by email, via facsimile, or even by telephoning to contacts in an address book and making, others aware that some information has changed and they need to manually update their contact list, which is time consuming.

A service offering automated updating of electronic contact information and ensuring most current contact information is offered by PeopleStreet through their World Wide Web site PeopleStreet.com. PeopleStreet addresses the difficult task of enabling people to stay connected to their many circles of contacts. The service provided by PeopleStreet manages the personal information and provides a dynamic link to all personal and professional relationships. This is performed by providing a method for each user to update their own address book entry, thereby automatically updating all the other user contacts of their new address book entry, wherever they may be.

Although the service that PeopleStreet provides does automate this tedious process, it does require that each party is a member of the service. In this manner information is updated from and to all parties subscribed to the service. This facilitates updating your personal information and being updated of others. A shortcoming of the method is that members of the address book, which are not already subscribed, still have to manually inform the subscribed user of their updated contact information according to the prior art updating method.

Contact.com also offers a similar type of contact service, which provides for the exchange of personal information. Once again, subscribed users decide which of their contacts are privileged to which information fields and as a result when the contact changes their personal information all the other address books linked to the contact are updated. This form of service requires the information to be stored on a central storage system. Although security may be strictly enforced, there are still security concerns because all personal information is accessible from outside the server.

Of course, when using email applications, a user is typically notified when a mail delivery error occurs. As such, the user is apprised of a possibly erroneous email address. The user must then proceed to try to correct the address or locate another valid email address. Once corrected, the user can only access the corrected address through their address database. Unfortunately, this is both inconvenient and prone to error. As such, it is generally a nuisance when email addresses expire or change.

It would be highly advantageous to provide a method for updating email address information in an automated fashion absent either security concerns or mandatory subscription to a service by each party within a given email address list.

SUMMARY OF THE INVENTION

In accordance with the invention there is provided a method for updating an electronic a contact information database comprising the steps of:

a) sending at least an electronic mail message to a contact destination of at least one contact from a plurality of contacts stored within the electronic contact information database of a user; and b) upon receiving a return message indicative of electronic mail message delivery failure, automatically flagging the contact destination as potentially expired within the contact information database.

In accordance with another aspect of the invention there is provided a method for updating an electronic contact information database wherein:

upon receiving an email message from a known contact using a previously unrecognized email address;

updating the contact information database to include the previously unrecognized email address in addition to the email address that is already stored;

wherein both addresses are associated with the contact.

BRIEF DESCRIPTION OF DRAWINGS

The invention will now be described with reference to the attached drawings. in which.

DETAILED DESCRIPTION OF INVENTION

Generally, according to the invention a method is provided for automatically maintaining an updated email address list in order to facilitate creation and sending of email messages and in order to facilitate address book maintenance.

Figure 1A:
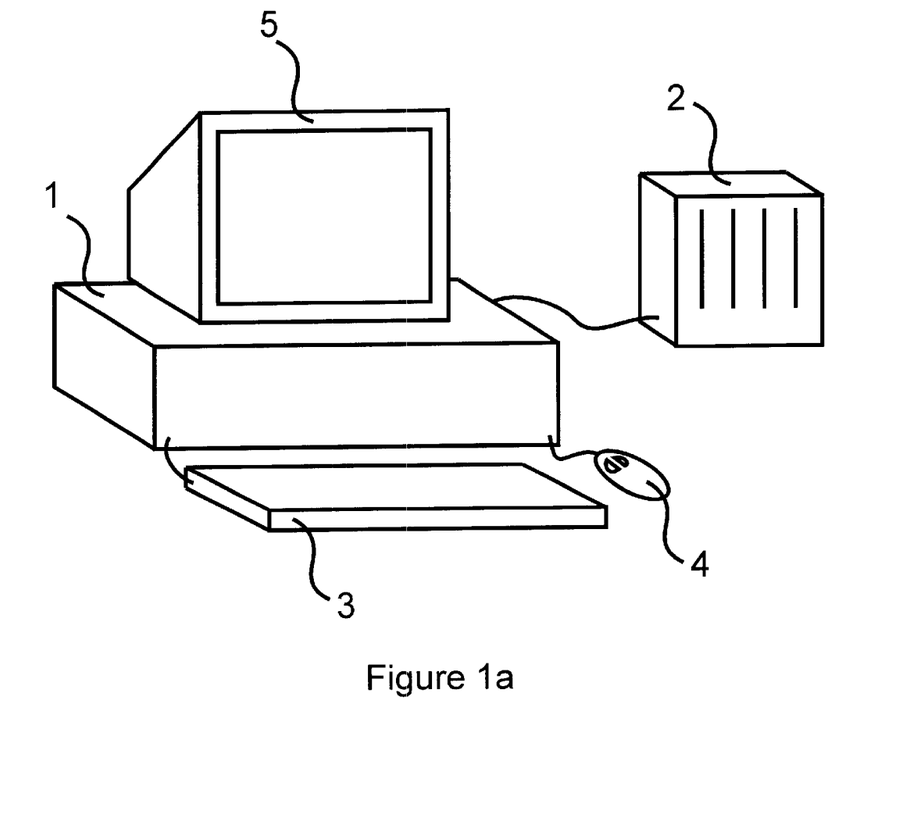
FIG. 1a is a simplified diagram of a computer system in execution of an electronic mail application.

Referring to FIG. 1a, a simplified block diagram of a computer system in execution of an electronic mail application is shown. The computer system 1 is in communication with a public network 2 such as the Internet for providing a communication medium across which to transmit electronic messages. The computer system 1 is connected to the internet via a local area network such as an Ethernet network, through a telephone line using a modem or another communication device, through a cable connections through a fibre optic connection or through a wireless connection. The computer is provided with a data entry transducer in the form of keyboard 3 and mouse 4. The computer system also includes a monitor 5.

Typically, the public network is in a process of directing many electronic mail messages at any time. The messages are provided to the network from a source system and are then directed within the network until they arrive at a destination computer system. Most often, the source and destination computer systems are in execution of an electronic mail program for creating and sending electronic mail messages and for receiving and displaying electronic mail messages.

Figure 1B:
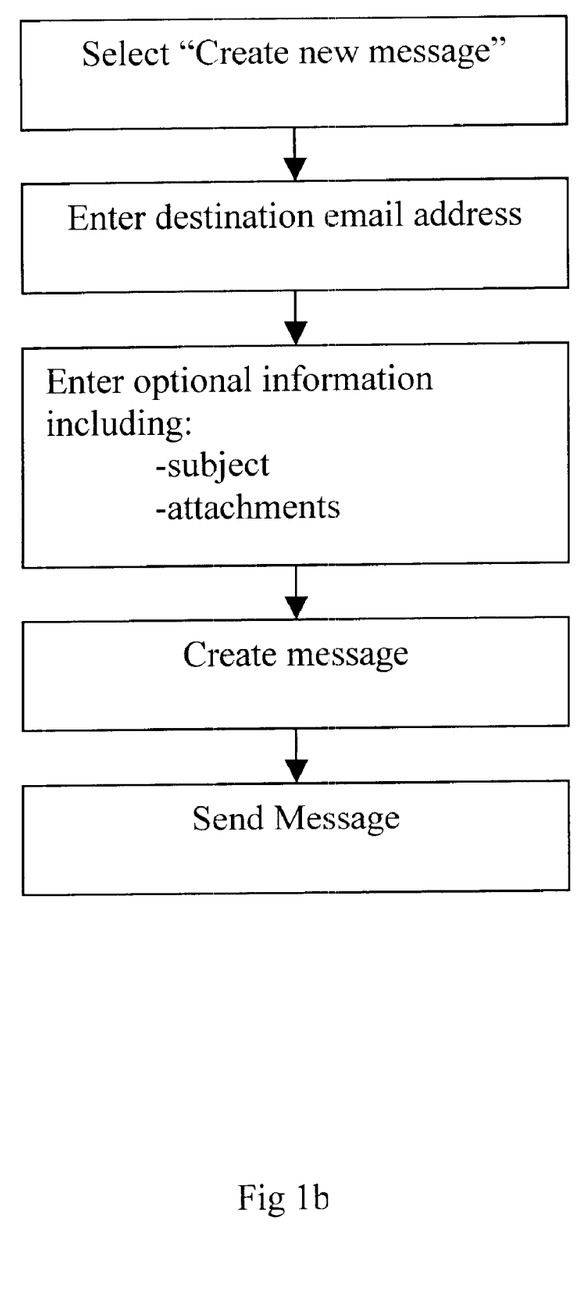
FIG. 1b is a simplified flow diagram of a prior art method of using an electronic mail application.

Referring to FIG. 1b, a simplified flow diagram of a prior art method of using electronic mail is shown. A user selects an option within an electronic mail application in execution to create a new email message. The email message typically requires a destination address and a return address. Though this is the case, typical email applications also provide for a subject line, message text, and attached electronic files. Once the text is entered, any files are attached, and a destination address is specified, the email message is transmitted via the network to its destination. Unfortunately, current email addresses are often less than intuitive. For example, an account for an employee at a large multinational company named, for example, Company whose name is John Smith may be john@ Company.com, smith@ Company.com, john$_{13}$ smith@ Company.com, jsmith@ Company.com, johns@ Company.com, john$_{13}$ smith23@ Company.com, or any other contraction, expansion, variation, or modification of the employee name. Also some companies don't use names in email addresses resulting in unintuitive names such as bf001@ Company.com.

In order to facilitate the use of electronic mail applications, they are typically provided with an address book feature. The address book feature allows an individual user to store email addresses along with an identifier they specify. For example, John Smith at Company is a great baseball player and his nickname is Slugger so a user might enter his destination address and then provide the nickname slugger for him. Upon creating a new email message, the destination slugger is automatically converted to the entered destination email address. Now, the address book is customised.

Of course, it is also possible to use external address book applications that are not integral to the electronic mail application.

Figure 1C:
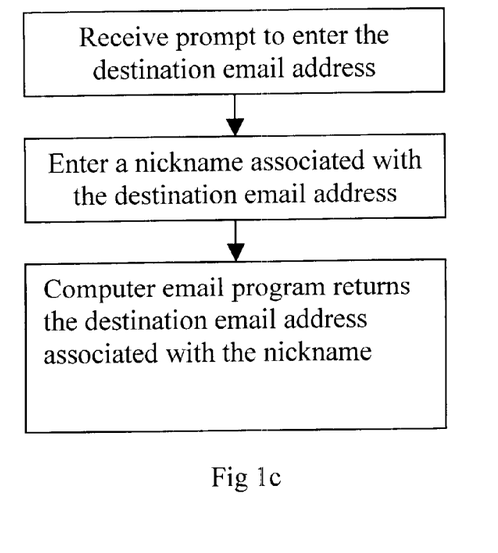
FIG. 1c is a simplified flow diagram of another prior art method of using an electronic mail application.

As is shown in FIG. 1c, the user enters the nickname where before the complete destination email address was entered.

Figure 2:
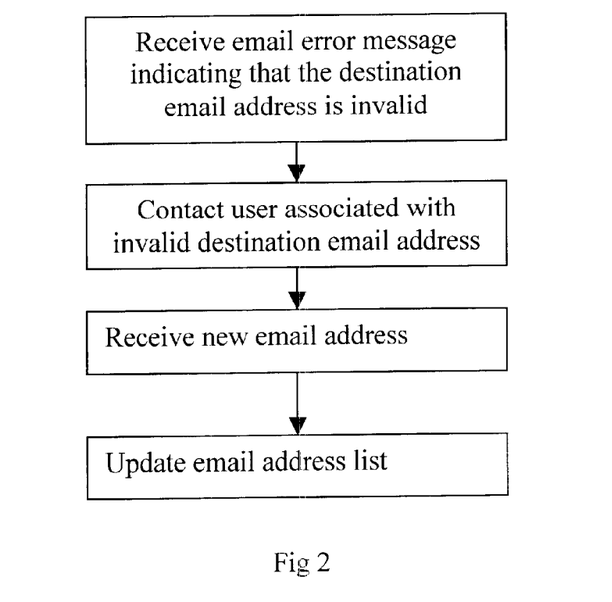
FIG. 2 is a simplified flow diagram of a method of manually updating an address book.

Referring to FIG. 2, a method of manually updating an address book is shown. For example, a message is received indicating that the email message addressed for destination John Smith is not deliverable. The user then calls John Smith to determine their correct email address. In the mean time, the user may delete the entry in the address book or leave it there. Once the new email address is received, the address book destination address for slugger is updated and the address book is maintained. This process is both cumbersome and prone to errors. The new destination address may be inserted with typos, the nickname may be reused countless times before it is updated, the entire entry may be deleted when only the email address was expired and so forth.

Another common method of determining a destination email address involves a reply feature common in most email applications. A message from the desired destination is located and a reply feature is invoked. Now a new message is created with the destination specified as the source of the located message. With people moving from one Internet provider to another, their email addresses change frequently. Thus it is common to locate an old email message that has an outdated source address and to then receive an error message because the reply message was undeliverable. These are common problems in dealing with email messages that require solutions.

Figure 3:
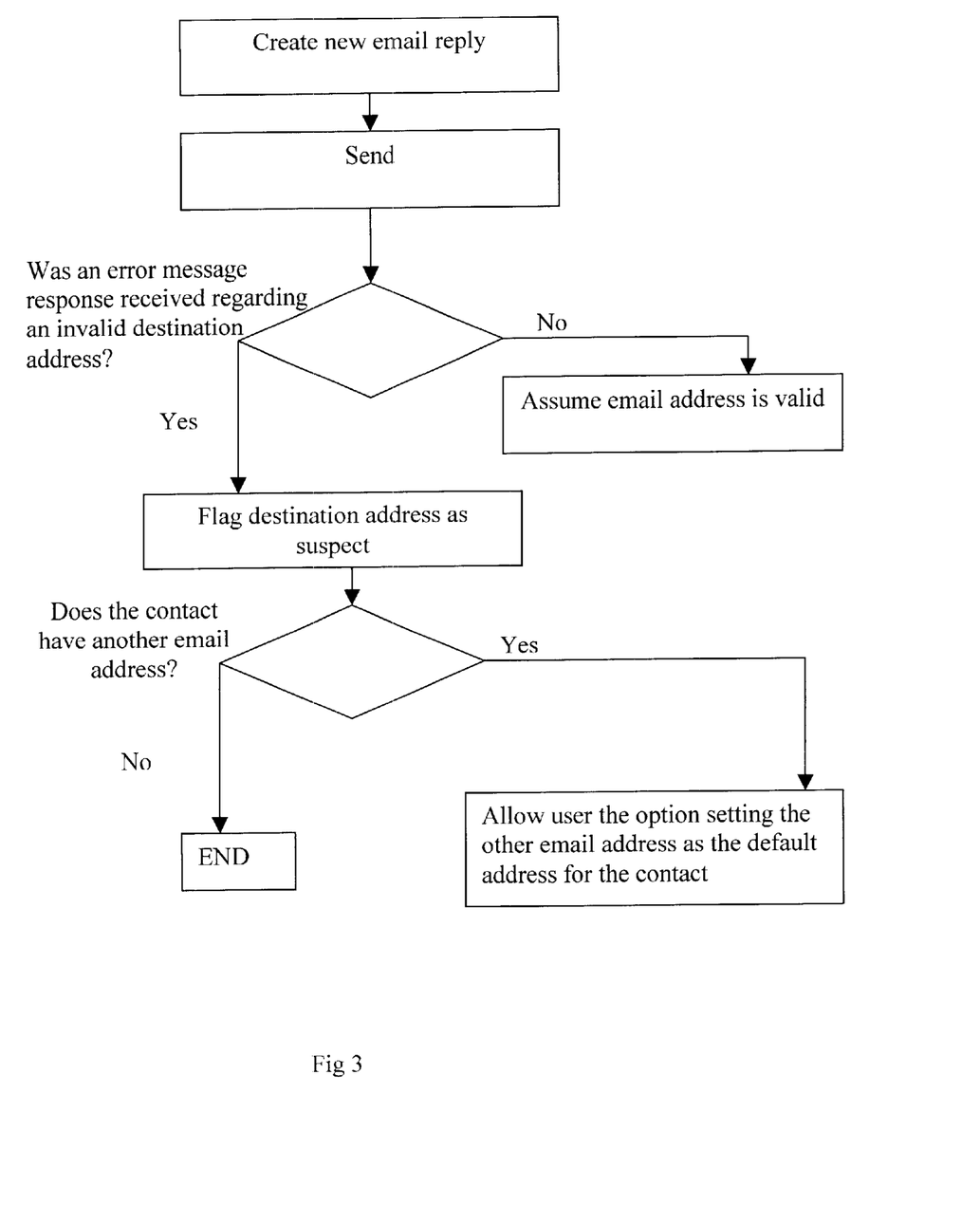
FIG. 3 is a simplified flow diagram of a method of automatically updating an address book.

Referring to FIG. 3, a method of automatically updating an email address list is shown. Here a new message is created and a destination address from the address book is used. If the message is delivered—no error is received—then the address is assumed to be valid. Though this is not always the case, statistically, a lack of a returned error message indicates safe delivery of an email message. Alternatively. when a message indicative of mail delivery failure is received, the message is parsed and the destination address within the address book is flagged as suspect. Once flagged, that address is no longer permitted by the email program.

The flagged address is maintained within the address book but is considered expired. When another email address exists for the destination individual, that email address becomes the email address of that destination individual. For example, Slugger's home email account address becomes the current email address for all electronic messages to John Smith at Company. Because the address book maintains information relating to expired addresses, attempting to direct a message to an expired address results in a notification to the user that the address is considered expired and that a newer address is known. The user is provided with an option of replacing the entered destination address with the newer address. Alternatively, the newer address is substituted for the expired address transparent to the user.

Figure 4:
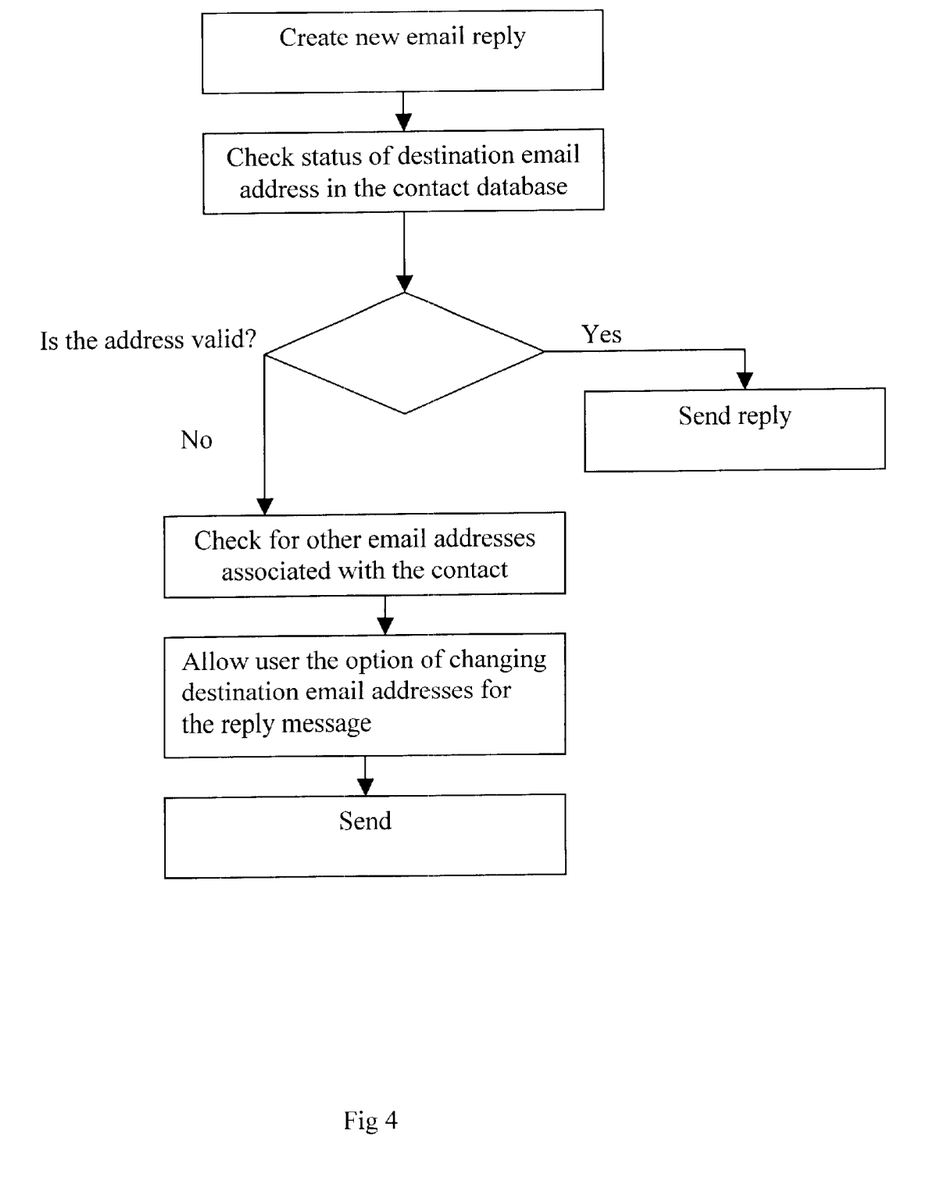
FIG. 4 is a simplified flow diagram of a method of automatically updating an address book for use with a reply feature of an electronic mail application.

Similarly, as shown in FIG. 4, when a user selects a reply feature the reply address is verified to determine that it has not expired. If it has expired, a notification is provided to the user that the address is considered expired and that a newer address is known. The user is provided with an option of replacing the entered destination address with the newer address. Alternatively, the newer address is substituted for the expired address transparent to the user. As such, a user is prevented from accidentally using an old expired email address.

When a newer email address is not known to the system, the user is still notified that the email address is considered expired. Thus, the user can avoid sending messages that merely result in errors and can wait to locate a current email address for the destination prior to sending out the email message.

Figure 5:
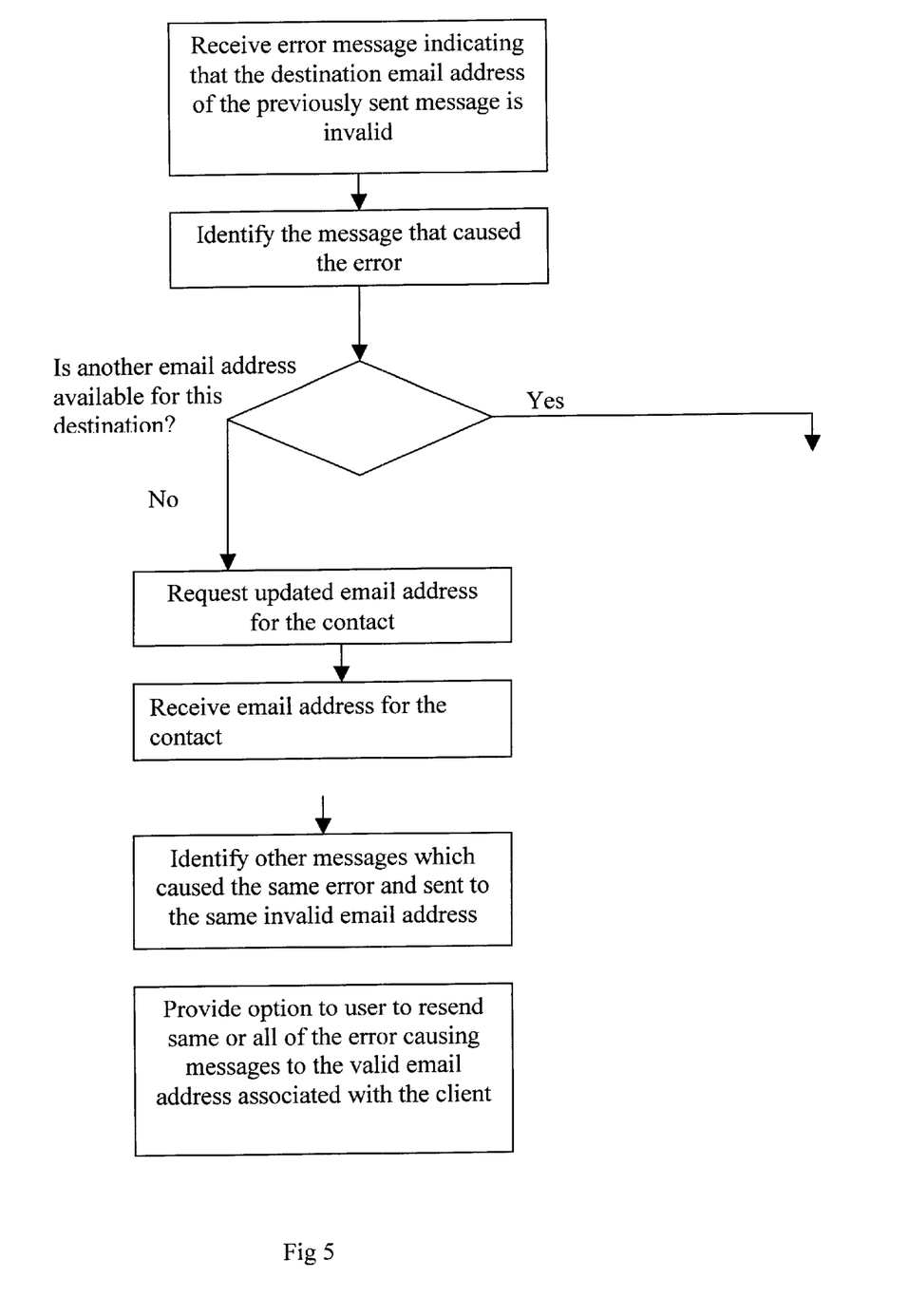
FIG. 5 is a simplified flow diagram of a method of locating a message that resulted in a transmission error and prompting a user to re-send the message with a known current email address for the destination individual.

Referring to FIG. 5, another feature of the invention is shown. Here, the email application locates the message that resulted in an error and prompts the user to re-send the message with a known current email address. Alternatively, when a current email address is unknown, the email application stores data indicative of the failed email message delivery such that when the address book is provided with a current email address for the destination individual, the user is automatically prompted to re-send each failed message to the now current email address. As such, fewer messages are not sent correctly where the sender believes them to be sent when in fact transmission fails.

Figure 6:
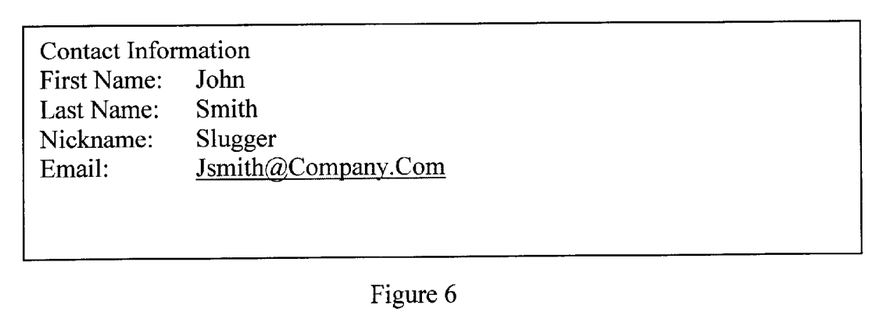
FIG. 6 is a simplified diagram of an email address book entry for Slugger.

Referring to FIG. 6, an email address book entry is shown for Slugger.

Figure 7:
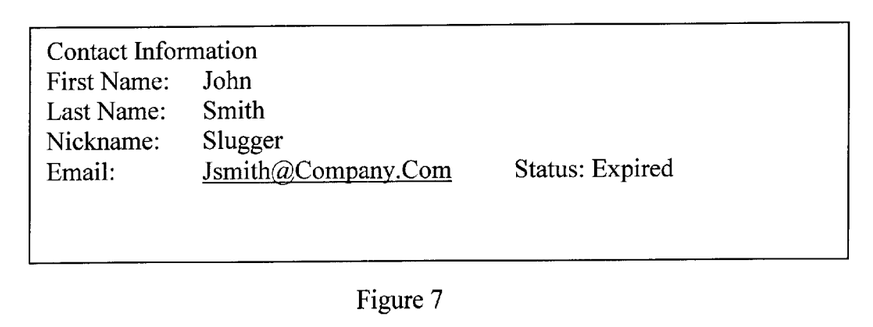
FIG. 7 is a simplified diagram of the email address book entry of FIG. 6 with the destination address expired; and, FIG. 8 is a simplified diagram of the email address book entry of FIG. 7 wherein an updated current email address is known for the destination.

Referring to FIG. 7, the email address book entry of FIG. 6 is shown with the destination address expired.

Now an option is provided to the user to view messages that failed in transmission due to the incorrect address.

Figure 8:
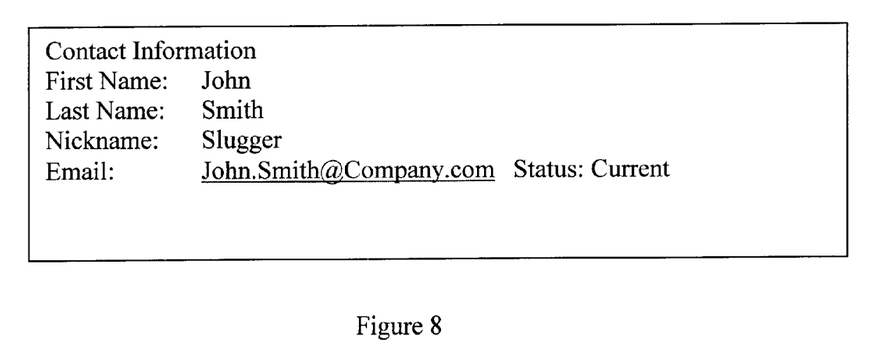

Referring to FIG. 8, the email address book entry of FIG. 7 is shown wherein an updated current email address is known for the destination.

In an alternative embodiment, once flagged the email application attempts to address messages to the flagged address over a period of time to verify that the address is indeed expired before the address is considered expired.

Numerous other embodiments may be envisioned without departing from the spirit or scope of the invention.

What is claimed is:

1. A method for updating an electronic contact information database comprising the steps of:
   a) sending from a first computer in execution of a first electronic mail application at least an electronic mail message to a contact destination of at least one contact from a plurality of contacts stored within an electronic contact information database of a user, the electronic contact information database associated with the first electronic mail application executed by the first computer; and
   b) upon receiving at the first computer in execution of a first electronic mail application a return message indicative of electronic mail message delivery failure, automatically flagging at the first computer in execution of a first electronic mail application the contact destination as potentially expired within the contact information database associated with the first electronic mail application executed by the first computer.

2. A method for updating an electronic contact information database as defined in claim 1 wherein the electronic mail application prevents sending of messages to contact destinations flagged as potentially expired.

3. A method for updating an electronic contact information database as defined in claim 1 comprising the steps of:
   transmitting further messages by the electronic mail application to the contact destination transparent to a user of the application for a period of time; and,
   when an error message is received for each transmitted further message flagging the contact destination as expired.

4. A method for updating an electronic contact information database as defined in claim 3 wherein the electronic mail application prevents sending of messages to contact destinations flagged as potentially expired.

5. A method for updating an electronic contact information database as defined in claim 1 comprising the steps of:
   automatically selecting another contact destination for a same contact within the contact information database as a primary contact destination for the same contact.

6. A method for updating an electronic contact information database as defined in claim 1 comprising the steps of:
   when an electronic message is to be sent to a contact destination flagged as potentially expired, automatically sending the message to another contact destination for the same contact.

7. A method for updating an electronic contact information database as defined in claim 1 comprising the steps of:
   when an electronic message is to be sent to a contact destination flagged as potentially expired, prompting a user of the electronic mail application to send the message to another contact destination for the same contact.

8. A method for updating an electronic contact information database comprising the steps of:
   a) sending at least an electronic mail message to a contact destination of at least one contact from a plurality of contacts stored within the electronic contact information database of a user;
   b) upon receiving a return message indicative of electronic mail message delivery failure, automatically flagging the contact destination as potentially expired within the contact information database; and
   c) the electronic mail application preventing sending of messages to potentially expired contact destinations.

9. A method for updating an electronic contact information database comprising the steps of:
   a) sending at least an electronic mail message to a contact destination of at least one contact from a plurality of contacts stored within the electronic contact information database of a user;
   b) upon receiving a return message indicative of electronic mail message delivery failure, automatically flagging the contact destination as potentially expired within the contact information database;
   c) transmitting further messages by the electronic mail application to the contact destination transparent to a user of the application for a period of time; and
   d) when an error message is received for each transmitted further message flagging the contact destination as expired.

* * * * *